United States Patent
Rank et al.

[15] 3,694,906
[45] Oct. 3, 1972

[54] METHOD FOR MANUFACTURING A HIGH SPEED SQUIRREL CAGE ROTOR

[72] Inventors: William E. Rank, Dayton; Gene L. Dafler, New Lebanon, both of Ohio

[73] Assignee: General Motors Corporation, Detroit, Mich.

[22] Filed: Oct. 14, 1971

[21] Appl. No.: 189,455

Related U.S. Application Data

[62] Division of Ser. No. 52,558, July 6, 1970, Pat. No. 3,662,200.

[52] U.S. Cl. ............. 29/598, 29/447, 310/42, 310/211, 310/217
[51] Int. Cl. .................. H02k 15/02, H02k 15/10
[58] Field of Search ........ 29/596, 598, 447; 310/211, 310/212, 42, 216, 217

[56] References Cited
UNITED STATES PATENTS

| | | |
|---|---|---|
| 3,477,125 | 11/1969 | Schwartz ............... 29/598 X |
| 3,234,419 | 2/1966 | Picozzi .................. 310/211 |
| 2,421,115 | 5/1947 | Carlson .................. 29/598 |

Primary Examiner—John F. Campbell
Assistant Examiner—Carl E. Hall
Attorney—Eugene W. Christen et al.

[57] ABSTRACT

In a preferred embodiment, a rotor for a dynamoelectric machine and method for manufacture includes a laminated rotor core mounted on a shaft sleeve which is mechanically expanded by an interference fit with the motor shaft. A pair of rotor end supports are mounted on the shaft sleeve in an axially supporting relationship with the ends of the rotor core and in a circumferentially supporting relationship with the ends of a winding carried by the rotor core.

3 Claims, 3 Drawing Figures

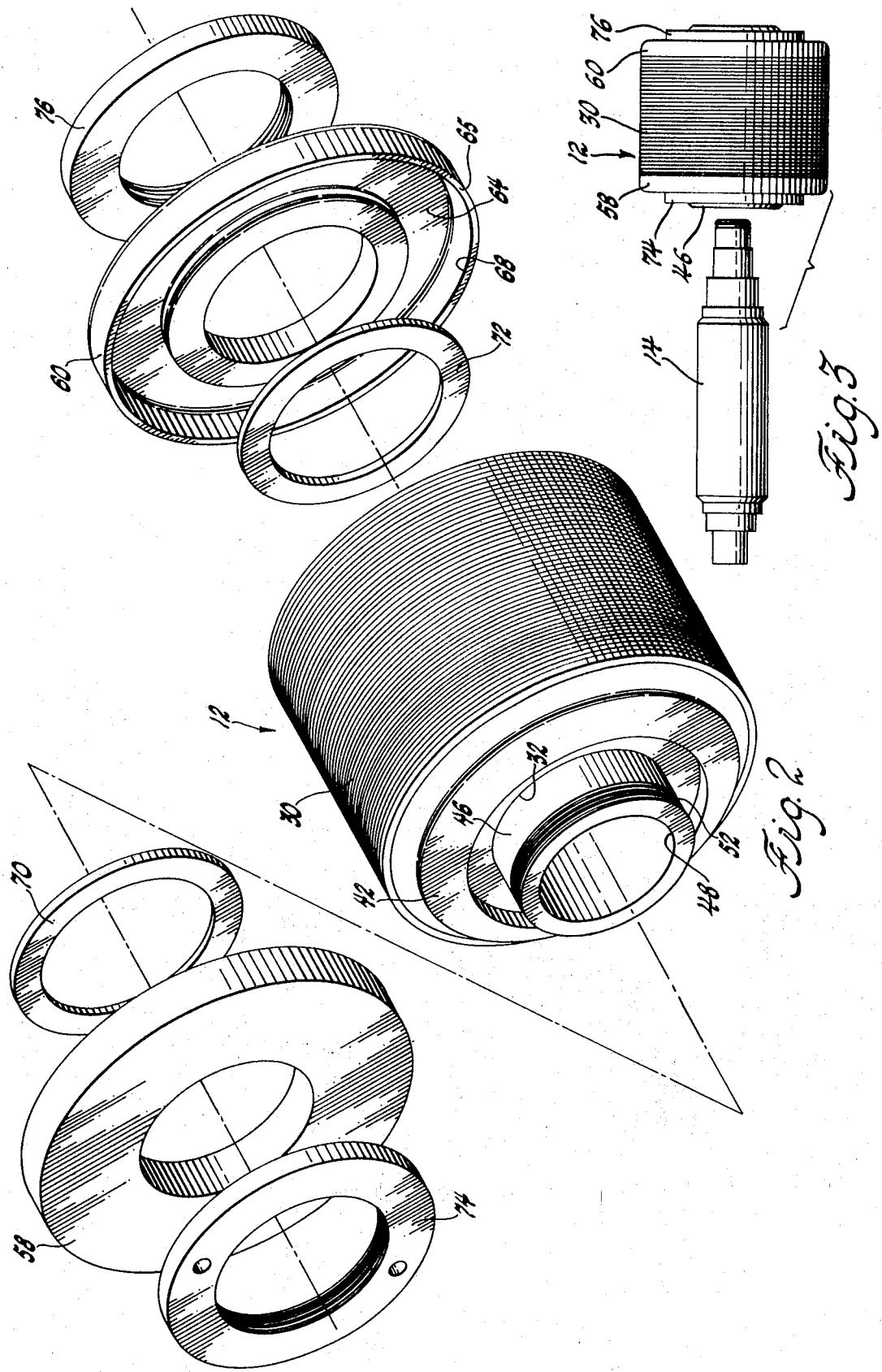

METHOD FOR MANUFACTURING A HIGH SPEED SQUIRREL CAGE ROTOR

This application is a Division of application Serial No. 52,558, filed July 6, 1970, now U.S. Pat. No. 3,662,200.

This invention relates to a rotor for a dynamoelectric machine and more particularly to a rotor construction for mounting and supporting a laminated rotor core on the shaft of a dynamoelectric machine and to a method for manufacture for assembling the laminated rotor core to the shaft.

The rotors of dynamoelectric machines usually include a rotor core fabricated from a stack of flat, disk shaped laminations. The laminations are preferably not connected together so that they are insulated from each other. For example, in squirrel cage rotors of large induction motors designed for high speed operation, the rotor core must be securely fastened in driving relationship to the motor shaft in a manner that prevents high mechanical stresses from being developed by the centrifugal forces associated with high speed operation. When a conventional key and keyway slot couple the shaft and the rotor core, undesirable stress concentrations develop around the slots. Also, there is a tendency for the stack of laminations forming the rotor core to tilt and shift axially relative to the shaft when the normally flat laminations are deformed by buckling or warping from the high centrifugal forces. This causes the mass of the rotor core to become redistributed and cause harmful rotor unbalance. A still further problem of high speed operation exists from the cyclic or alternating stresses and elastic deformations occurring in the rotor laminations. These tend to cause stress fatigue and cracking, especially in the inner radial portions of the laminations, which substantially reduces the reliability and operating life of the rotor.

The conductor bars and conductive end rings of squirrel cage windings made of aluminum and operated in high ambient temperatures lose their physical strength. At high rotor speeds, the end rings tend to shear and separate from the ends of the rotor core. Also, differences in the rate of elastic growth between the stack of laminations and the end rings, resulting from differences in the mass and strength characteristics, causes additional shear stress on the end rings.

In accordance with the present invention and with the aforementioned problems in mind, a dynamoelectric machine and method for manufacture is provided for a laminated rotor core carrying a squirrel cage winding including conductor bars terminated by a pair of conductive end rings. A tubular shaft sleeve supports the rotor core and a pair of rotor end supports including annular cavities conforming to the contour of the end rings are mounted against the ends of the rotor core so as to support the rotor core ends and the end rings. Clamping rings secured to the sleeve ends maintain the rotor end supports axially compressed to the rotor core ends. The shaft sleeve has a substantial interference fit with the shaft so that when it is shrink fitted thereto it is mechanically expanded radially outward against the bore of the rotor core. This provides predetermined radial compressive and tangential tensile prestresses in the laminations and in the rotor end supports to relieve the effects of stress developed by high centrifugal forces.

It is a primary object of this invention to provide an improved rotor and method of manufacture for a dynamoelectric machine intended for high speed operation in which a laminated core is connected to the machine shaft with predetermined radially compressive prestresses to reduce alternating tensile stresses and with the rotor ends supported to maintain the rotor parts upright and in a balanced condition.

A further object of this invention is to provide a rotor for a dynamoelectric machine and method for manufacture in which a laminated rotor core is mounted on a tubular shaft sleeve with a pair of annular rotor end supports axially clamped to the rotor ends so that when the tubular sleeve is subsequently interference fitted to the machine shaft the rotor core is compressively clamped to the shaft.

A still further object of this invention is to provide a squirrel cage rotor including a laminated rotor core carrying conductor bars and conductive end rings and mounted to a shaft by a mechanically expanded tubular shaft sleeve in which the sleeve also supports a pair of rotor end supports which engagingly support the ends of the rotor core and have a predetermined shape so that the compressive prestresses therein provide predetermined restrained elastic deformation of the end rings which substantially matches the elastic deformation of the rotor core so as to reduce shearing stress between the conductor bars and the end rings.

And a still further object of this invention is to provide a squirrel cage rotor and method for manufacture in which a laminated rotor core carrying a squirrel cage winding having conductor bars and conductive end rings is mounted on a tubular shaft sleeve wherein a pair of rotor end supports are mounted over the end rings and are pressed against the rotor ends by a pair of clamping rings secured to the ends of the tubular sleeve so as to axially compress the rotor core laminations to prevent buckling and warping of the laminations, and further wherein the shaft sleeve is shrink fitted to the shaft and provides a predetermined interference fit therebetween so that radial and tangential prestresses are provided in the laminations and the rotor end supports for substantially reducing the effects rotationally produced radial tensile stresses developed on the end rings and the inner radial portion of the rotor core laminations.

IN THE DRAWINGS:

FIG. 2 is an exploded perspective view of a portion of the squirrel cage rotor illustrated in FIG. 1.

FIG. 3 is an elevational view of the rotor illustrated in FIG. 2 separated from the machine shaft.

Figure 1:
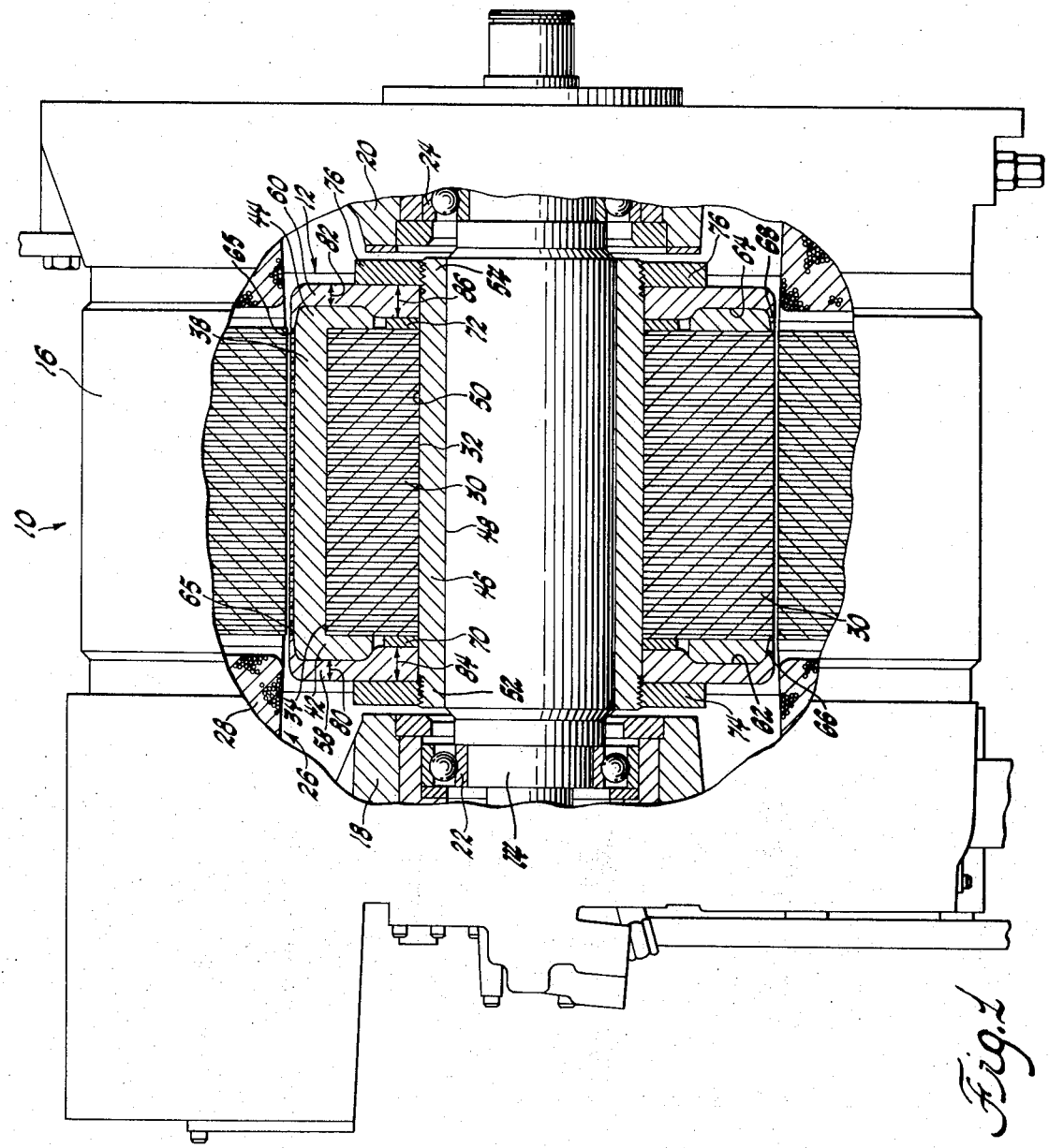
FIG. 1 is an elevational view partially sectioned illustrating a dynamoelectric machine including a squirrel cage rotor made in accordance with the present invention.

Referring now to the drawings and more particularly to FIG. 1, a dynamoelectric machine provided by an electric drive motor 10 is illustrated including a squirrel cage rotor 12 made in accordance with the construction and method for manufacture of the present invention. The electric drive motor 10 is an alternating current induction motor intended for use in one preferred embodiment, as a traction motor for large, heavy-duty vehicles of the earth moving or off-highway types. The drive motor 10 is capable of developing a maximum torque of 900 foot-pounds at the shaft 14 of the machine over a speed range of 600 to 12,000 r.p.m. The motor shaft 14 is coupled to one or more of the driving wheels of a vehicle through a suitable gearing arrangement.

A housing 16 supports a pair of end frame sections 18 and 20 carrying bearings 22 and 24. The opposite ends of the shaft 14 have reduced diameters journaled for rotation in inner races of the bearings 22 and 24. A stator 26 including a polyphase winding 28 is supported in the housing 16 and encloses the circumference of the rotor 12. Alternating current supplied to the stator winding 28 develops a magnetic flux across an air gap to the rotor 12 so that torque is developed to rotate the shaft 14 in a manner well understood by those skilled in the art of electric motors.

The squirrel cage rotor 12 includes a cylindrical rotor core 30 formed by a stack of disk shaped laminations made of a suitable magnetic iron material. A circular bore opening 32 extends axially through the center of the rotor core 30 for receiving the shaft 14 as described in detail hereinbelow. A circumferential series of winding slots 34 extend axially through the rotor core 30 near the outer diameter. A squirrel cage winding formed of aluminum includes conductor bars 38 carried by the winding slots 34 and a pair of conductive end rings 42 and 44 formed integrally with the ends of the conductor bars 38 in a die casting process. The pair of end rings 42 and 44 extend axially from the ends of the rotor core 30 and interconnect the conductor bar ends to provide electrically short circuiting conductive paths in accordance with the construction of squirrel cage windings.

A tubular shaft sleeve 46 made of a steel tube material carries the rotor core 30 and has an inner diameter 48 which is shrink fitted to the center portion of the shaft 14. The outer diameter 50 of the shaft sleeve 46 has a tight sliding fit with the bore opening 32 of the rotor core 30 prior to assembling the shaft sleeve to the shaft 14. The sleeve ends 52 and 54 are externally threaded for purposes which are described further hereinbelow. The shrink fitting of the shaft sleeve 46 to shaft 14 expands the shaft sleeve radially outward so that it is securely clamped to the shaft and against the rotor core opening 32. The laminations of the rotor core 30 are compressively prestressed by the mechanical expansion of the shaft sleeve 46 as also described in further detail hereinbelow.

A pair of annular rotor end supports 58 and 60 made of a high strength nonmagnetic metal material such as Titanium are provided at the ends of the rotor core 30. The inner diameter of each of the rotor end supports 58 and 60 has a tight sliding fit over the outer diameter 50 of the shaft sleeve 46 similar to the sliding fit of the rotor bore opening 32. The sides of the rotor end supports extend to an outer diameter which is adjacent the outer diameter of the rotor core 30. Annular recessed portions forming concave cavities 62 and 64 are disposed on the inner axial sides of the rotor end supports 58 and 60, respectively. The axial cross sections of the concave cavities 62 and 64 are complementary to the contour of the end rings 42 and 44 so as to receive the end rings when mounted on the shaft sleeve 46. Annular lips 66 and 68 are formed adjacent the outer radial side portions of the cavities 62 and 64 so as to circumferentially overlap the outer diameters of the end rings 42 and 44 and provide circular rims 65 which abut the axial ends of the rotor core 30 at the outer diameters thereof. Accordingly, the outer radial and bottom side portions of the cavities 62 and 64 engage the end rings 42 and 44 to provide restraining supports thereof. The cross sectional widths of the rotor end supports 58 and 60 produce a desired distribution of compressive prestresses after being mounted to the shaft sleeve 46. This provides a limited, controlled radial and circumferential elastic deformation of the end rings 42 and 44 as explained more fully hereinbelow.

A pair of spacer rings 70 and 72 connect the radially inward section of the rotor end supports to the axial ends of the rotor core 30 adjacent the bore opening 32. Accordingly, the rotor end supports provide axial restraint at both the inner and outer radial portions of the rotor core ends.

A pair of rotor clamping rings are provided by spanner nuts 74 and 76 having internally threaded openings mating with the sleeve threaded ends 52 and 54. The spanner nuts 74 and 76 are made of a high strength heat treated steel and apply axially inwardly directed forces to the rotor end supports 58 and 60 to compress the laminations of the rotor core 30. Thereby, the rotor end supports are clamped in engagement with the axial ends of the end rings 42 and 44 to prevent the laminations of the rotor core 30 from warping and buckling after the shaft sleeve 46 is radially expanded by being mounted on the shaft 14. The compressive force applied by the spanner nuts 74 and 76 is in the order of 100,000 pounds.

As thus described, the rotor assembly 12 is mounted to the shaft 14 without the use of keys or other means such as welding for connecting the rotor core 30 and the shaft sleeve 46 to the shaft 14. Further, the laminations of the rotor core 30 are held in axial compression solely by the clamping force applied by the spanner nuts 74 and 76 so that welding beads along the edges of the laminations are avoided as are often used in many laminated rotor core assemblies. Further, it is to be understood that since the electric drive motor 10 is to be employed to drive heavy duty loads such as a vehicle, cooling arrangements, which do not form a part of the present invention, for either the stator 26 or rotor 12 may be desirable.

Referring now to the method of manufacture of one preferred embodiment made in accordance with this invention, the assembling of the squirrel cage rotor 12 is best described with reference to the exploded view of FIG. 2. A stack of disk laminations are assembled to form the rotor core 30. The laminations are each 0.014 inch thick and are assembled in a stack having a length of 7.0 inches. The outside diameter of the rotor core stack is 11.5 inches and the diameter of the rotor bore opening 32 is 5.25 inches. To form the squirrel cage winding, the conductor bars 38 are then formed in the series of winding slots 34 and the conductive end rings 42 and 44 are formed on the ends thereof in a die casting process. The end rings 42 and 44 extend axially 0.5 inch from each end of the rotor core 30 and have an outside diameter of 11.24 inches and an inside diameter of 9.45 inches.

Assembly of the rotor core 30 to the shaft 14 begins with providing the shaft sleeve 46 with a length of approximately 10.0 inches so that it extends beyond the ends of the rotor core and an outside diameter of 5.25 inches so that a sliding fit is formed with the rotor bore opening 32. The ends 52 and 54 are externally threaded to mate with the spanner nut threads. The inner diameter 48 extends approximately 4.0 inches so as to have an interference clearance of 0.011 to 0.014 inch with the shaft 14.

A spanner nut, for example 74, is threaded to one sleeve end, for example, 52. The spanner nuts 74 and 76 have an outside diameter of 8.25 inches and a thickness of 0.5 inch. The rotor end support 58 is on the shaft sleeve 46 against the spanner nut 74. The rotor end supports 58 and 60 are provided with concave cavities 62 and 64 which conform to the outer surfaces of the end rings 42 and 44. Beginning at the outer radial sections, the axial widths of the rotor end supports include the annular lips 66 and 68 extending 1.0 inch from the outer axial side of each of the rotor end supports, the axial widths 80 and 82 adjacent the axial ends of the end rings 42 and 44 are approximately 0.5 inch, and the axial widths 84 and 86 axially adjacent the spacer rings 70 and 72 are 0.75 inch. The axially inward rims 90 formed by the annular lips 66 and 68 have a height of approximately 0.20 inch. The spacer rings 70 and 72 including outside diameters of 7.5 inches and thickness of 0.25 inch are mounted with the spacer ring 70 on the shaft sleeve 46 and against the rotor end support 58.

The shaft sleeve 46 with the spanner nut 74, rotor end support 58 and spacer ring 70 is inserted through the center bore opening 32 of the rotor core 30. The spacer ring 72 and rotor end support 60 are then mounted over the sleeve end 54 against the opposite end of the rotor core 30. The remaining spanner nut 76 is threaded on the sleeve end 54 and is torqued to axially compress the rotor end supports 58 and 60 and spacer rings 70 and 72 against the ends of the rotor core thereby compressing the rotor core laminations. As noted hereinabove, the spanner nuts 74 and 76 are torqued so that an axial compressive force of about 100,000 pounds is applied across the ends of the rotor core 30.

The shaft sleeve 46 with the rotor core assembly 30 is then placed in an oven or otherwise heated to a temperature of approximately 800° F. for shrink fitting the shaft sleeve 46 to the shaft 14. The heated shaft sleeve 46 mechanically expands radially outward so that the shaft 14 may be inserted into the inner diameter 48 of the shaft sleeve 46. With the shaft sleeve 46 expanded, the shaft 14 is aligned with the inner diameter 48 of the shaft sleeve, as illustrated in FIG. 3, and is inserted therein. When the shaft sleeve 46 and shaft 14 are cooled to ambient temperatures an interference fit of 0.011 to 0.014 inch is provided between the shaft sleeve 46 and shaft 14. This maintains the shaft sleeve 46 in a radially expanded condition on the shaft 14. The outer diameter 50 of the shaft sleeve 46 is compressively clamped radially against the rotor bore opening 32 thereby securing the rotor core 30 to the shaft 14.

The radial and circumferential expansion of the shaft sleeve 46 produces high radial compressive and tangential circumferential prestress in the laminations of the rotor core 30. The level of compressive prestress decreases radially outward from the bore opening 32 such that the outer diameter of the lamination is in a substantially neutral stress condition. The high strength and axially clamping force of the rotor end supports 58 and 60 maintain the laminations of the rotor core upright and prevent any axial shifting following the shrink fitting to the shaft 14.

The radial expansion of the shaft sleeve 46 also produces radial and tangential compressive prestress in the rotor end supports 58 and 60. The prestress is also distributed radially outward from the inner radial portions of the rotor end supports 58 and 60 so that the lip portions 66 and 68 are in a substantially neutral stress condition.

Following assembly of the rotor core 30 and shaft sleeve 46 to the shaft 14, the shaft 14 is then rotatably mounted on the bearings 22 and 24 and enclosed within the housing 16.

In operation of the electric drive motor 10 at high shaft speeds approaching the maximum speed of 12,000 r.p.m., high rotational forces are developed on the parts of the squirrel cage rotor 12 due to both the speed and considerable mass provided by the parts of the squirrel cage rotor 12. Radial and tangential tensile forces acting on the laminations of the rotor core 30 and the end rings 42 and 44 tend to pull the laminations and end rings radially outward away from the shaft 14. The end rings 42 and 44 being made of aluminum and operating at elevated temperatures tend to separate from the ends of the conductor bars 38 and the rotor core 30 when the rotor end supports 58 and 60, of this invention, are not employed. An elastic deformation or mechanical growth of the laminations of the rotor core also tends to develop further shearing stresses at the connections between the ends of the conductor bars 38 and the end rings 42 and 44.

The radial outward deformation of the rotor core 30 is in the order of 0.002 to 0.003 inch. Accordingly, the cross-sectional configuration of the rotor end supports 58 and 60 as described hereinabove and the compressive prestress condition causes the annular lips 66 and 68 to have a substantially identical radially outward deformation to that of the rotor core. Therefore, the rotor end supports 58 and 60 support the end rings 42 and 44 to prevent their separation from the ends of the rotor core and also permit a limited uniform elastic deformation thereof which matches that of the rotor core 30.

The critical areas of stress fatigue in laminated rotor cores of the type corresponding to the rotor core 30 when operating at high speeds are the radial sections adjacent the bore opening 32. Tension forces developed by the rotation forces at speeds in the order of 12,000 rpm are substantially neutralized by the compressive prestress provided in the laminations of the rotor core 30. The level of compressive prestress provided by the interference fitting between shaft sleeve 46 and shaft 14 is such that the rotor laminations remain in a condition of compression up to and including the maximum operating speeds of the shaft 14. In the preferred embodiment of the squirrel cage rotor 12 described hereinabove, the bore opening 32 of the rotor core was found to have a radial elastic expansion of approximately 0.010 inch when operated at a tested speed of 15,000 rpm. Accordingly, the construction of this invention prevents failures from fatigue and cracking of the laminations that are associated with high speed tension stresses developed in the rotor laminations when they are mounted without the radial compressive prestresses provided in accordance with the description hereinabove.

The rotor core 30 is mechanically connected in driving relationship with the shaft 14, as described hereinabove, so as to develop the required torque at the shaft 14. The rotor parts are mounted with predetermined prestress conditions which are maintained to prevent fatigue and failure of the rotor parts by high level alternating stresses produced by high rotational forces. This provides a reliable and rugged assembly capable of operating under heavy duty conditions at high speeds without shifting of the mass of the parts causing unbalance. The mounting of the rotor end supports 58 and 60 at the ends of the rotor core laminations eliminates the use of welding or other integral fastening means at the laminations and the use of keys between the shaft 14 and the rotor core 30. Accordingly, the assembly of the rotor parts permits simple and economical manufacturing procedures especially desirable in high volume production.

While the embodiment of the present invention as herein disclosed constitutes a preferred form, it is to be understood that other forms might be adopted.

What is claimed is:

1. A method of manufacture for a rotor of a dynamoelectric machine, the steps comprising: assembling a stack of laminations in axial alignment to form a rotor core having an axially extending center bore; slidingly fitting a tubular sleeve within said center bore to mount said rotor core on said tubular sleeve; axially clamping said stack of laminations between a pair of end supports in a fixed axial position relative to said tubular sleeve; and shrink fitting said tubular sleeve on a rotatable shaft having a predetermined interference fit with the inner diameter of said tubular sleeve to radially expand said tubular sleeve within said center bore thereby radially clamping said rotor core in driving relationship with said rotatable shaft with said stack of laminations being maintained in said fixed axial position by said pair of end supports.

2. A method for manufacture for a squirrel cage rotor of a dynamoelectric machine of the alternating current drive motor type, the steps comprising: assembling a stack of laminations in axial alignment to form a rotor core having a center bore opening and a plurality of winding slots forming conductor bars in said winding slots and a pair of conductive end rings extending axially from the ends of said rotor core to provide a squirrel cage winding; slidingly fitting a tubular sleeve into said center bore opening of said stack of laminations to mount said rotor core on said tubular sleeve; slidingly fitting a pair of annular rotor end supports over opposite ends of said sleeve and adjacent the ends of said rotor core, each of said rotor end supports being adapted to circumferentially enclose said pair of conductive end rings and axially support the of said stack of laminations; mounting a pair of clamping rings on opposite ends of said tubular sleeve and against said pair of annular rotor end supports; pressing said pair of clamping rings and said pair of rotor end supports against the ends of said rotor core whereby said stack of laminations is axially compressed; securing said pair of clamping rings in a fixed axial position on the ends of said tubular sleeve so that the axial compression of said stack of laminations is maintained by said pair of clamping rings; and shrink fitting said tubular sleeve to the shaft of said motor whereby said tubular sleeve is expanded radially outward by the shrink fitting therebetween so as to be clamped against said center bore opening of said rotor core and form a driving connection between said rotor core and said shaft.

3. A method for manufacture for assembling a squirrel cage rotor to the shaft of a dynamoelectric machine of the alternating current drive motor, the steps comprising: assembling a stock of laminations in axial alignment to form a rotor core having a center bore opening and a plurality of winding slots forming conductor bars in said winding slots and a pair of conductive end rings extending axially from the ends of said rotor core to provide a squirrel cage winding; slidably inserting a tubular shaft sleeve having externally threaded ends into said center bore opening to mount said rotor core on said tubular shaft sleeve, said sleeve including an inner diameter having a predetermined interference fit with the outer diameter of said shaft of said motor in the range of 0.011 to 0.014 inch; slidably mounting a pair of annular rotor end supports over opposite ends of said sleeve and adjacent the ends of said rotor core, each of said annular rotor end supports including an annular cavity having a cross-sectional configuration for receiving the inner and outer peripheries of said pair of conductive end rings; threading a pair of clamping rings on said threaded ends of said tubular shaft sleeve and against said pair of annular rotor end supports against the ends of said rotor core whereby said annular cavities receive said pair of end rings and said stack of laminations is provided with a predetermined axial compressive force across the ends thereof; terminating the threading of said pair of clamping rings so that said axial compressive force is maintained by said pair of clamping rings and said stack of laminations is maintained in a fixed axial position relative to said tubular shaft sleeve; and shrink fitting said tubular shaft sleeve to said shaft whereby said sleeve is expanded radially outward by said predetermined interference fit therebetween for radially clamping to said center bore opening of said rotor core in driving relationship with said shaft and developing predetermined radially compressive and tangential tensile prestresses in said stack of laminations and said pair of rotor end supports to reduce opposing alternating stresses developed in said stack of laminations by centrifugal forces when said shaft is rotated at high speeds.

* * * * *